United States Patent [19]

Girala

[11] 4,305,205

[45] Dec. 15, 1981

[54] OPEN ENDED TUBING CUTTERS

[75] Inventor: Anthony S. Girala, Houston, Tex.

[73] Assignee: The United States of America as represented by the Administrator of the National Aeronautics and Space Administration, Washington, D.C.

[21] Appl. No.: 138,944

[22] Filed: Apr. 9, 1980

[51] Int. Cl.³ .............................................. B23D 21/06
[52] U.S. Cl. ..................................................... 30/102
[58] Field of Search ................................... 30/101, 102

[56] References Cited

U.S. PATENT DOCUMENTS

| | | | |
|---|---|---|---|
| 882,432 | 3/1908 | Thomas | 30/101 |
| 2,325,353 | 7/1943 | Wright | 30/102 |
| 2,447,371 | 8/1948 | Sipsma et al. | 30/101 |
| 3,715,804 | 2/1973 | Kelley | 30/102 |
| 3,807,047 | 4/1974 | Sherer et al. | 30/101 |

*Primary Examiner*—James L. Jones, Jr.
*Attorney, Agent, or Firm*—Edward K. Fein; John R. Manning; Marvin F. Matthews

[57] ABSTRACT

A self-clamping cutting tool which includes a handle (11) attached to a C-shaped housing (12) and has an opening (13) sized to admit a pipe (23). Rotatably mounted within the housing is a C-shaped tool body (24) carrying a set of clamping rolls (27, 28 and 31) and two support rolls (51 and 52) and an edged cutting roll (64). The support rolls are disposed to one side of the axis (29) of a pipe and the cutting roll is disposed to the other side of a pipe axis so that these rolls contact a pipe at three circumferential points. Cutter advancing apparatus (63, 65, 66, 67, 68) advance the cutting roll toward the support rollers. The support rolls and cutting roll are rotatable independently of the C-shaped housing. A one way ratchet mechanism (41, 43) disposed between the C-shaped housing and the C-shaped tool body permits operation by movement in one rotational direction about the pipe axis. In another embodiment, the tool body is rotated by a power driven mechanism (80–87). In addition, an automatic cutter advancing device (75–79) can be provided.

9 Claims, 12 Drawing Figures

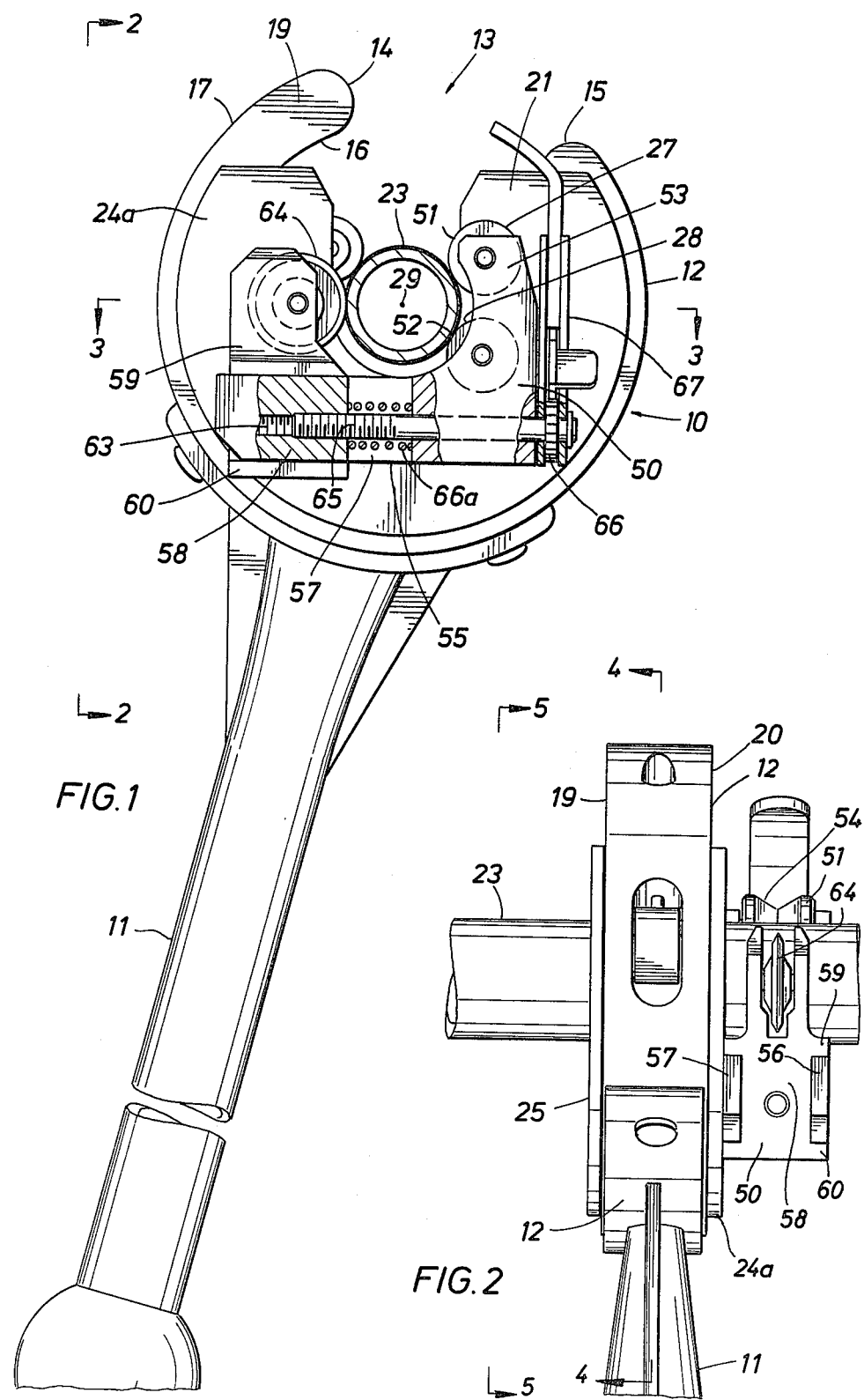

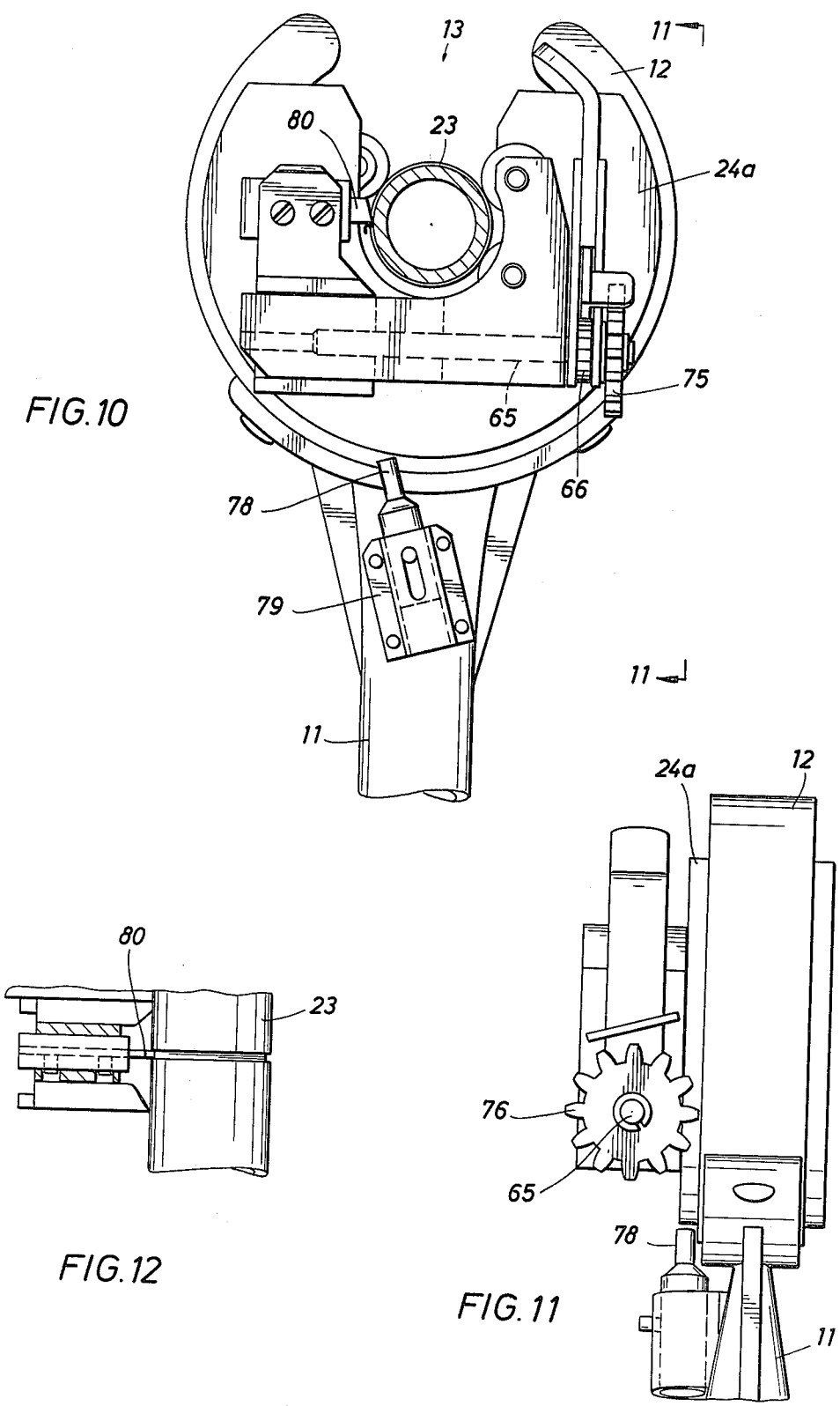

OPEN ENDED TUBING CUTTERS

DESCRIPTION

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates to tube cutting tools, and more particularly, to a tube cutting tool which is operable by one hand with limited angular motion and without requiring the complete rotation of a turning arm about the tube to be cut. Alternatively, the cutting tool can be rotated about a tube by a power driving mechanism and the cutting tool can be automatically advanced.

BACKGROUND OF THE INVENTION

Tube or pipe cutting tools typically include an open-throated tool body attached to a torque arm. On the tool body are two pressure rolls and a cutting roll which are disposed to either side of a pipe axis for contacting opposing sides of a pipe to be cut. The cutter roller or cutter wheel is typically attached to an advancing mechanism in the torque arm so that as the tool body is rotated around the pipe to be cut, the cutter roller can be advanced inwardly toward the central axis of the pipe and thereby perform a cutting function.

In many instances, and this is particularly true in space craft, it is desirable to have various pipes located near to, or attached to, a wall surface. The close spacing of pipes prevents use of a conventional pipe cutting instrument where a torque arm must be rotated entirely about the axis of the pipe to be cut. There is a need to provide a pipe cutting instrument which is particularly capable of cutting a pipe in confined spaces and which does not require complete rotation of the torque arm about the pipe.

Prior art patents which are indicated as relevant by a search are as follows:

U.S. Pat. No. 364,090
U.S. Pat. No. 514,000
U.S. Pat. No. 543,953
U.S. Pat. No. 583,892
U.S. Pat. No. 805,927

THE PRESENT INVENTION

The present invention includes a hand-operated tool where a C-shaped housing is attached to an elongated tool arm. Rotatably supported within the C-shaped housing is a C-shaped tool body. The tool body has a pair of support rolls and a cutter roll disposed on axes parallel to the axis of a pipe to be cut. The support rolls are fixed in position in the tool body while the cutter roll is mounted on a cutter advancing mechanism. The cutter advancing mechanism moves the cutter roll toward and away from the axis of a pipe to be cut while the other support rolls provide a counter balance reaction during the cutting operation. The tool body also carries a set of clamping rolls disposed adjacent to the support rolls. Two of the clamping rolls are fixed in position in the tool body while the other clamping roll is mounted on a spring biased arm. The spacing of the clamping rolls is such that the spring biased roll is moved outwardly from the central axis of the tool body while the tool is being attached to the pipe and moves inwardly when the pipe is in a pipe cutting position within the tool body. Thus, a pipe is clamped by the resilient force of the spring biased arm within the set of clamping rolls. The tool body is rotatively mounted within the tool housing and a ratchet mechanism between the tool body and tool housing permits relative rotation between the tool body and the tool housing in only one rotation direction. Thus, the tool body can be rotated about a pipe with limited angular motion of the tool handle.

In another aspect of the present invention, the tool body can be rotated about a pipe by a power driven mechanism on the tool handle. In still another aspect of the present invention, the cutter roll can be advanced by operating the advancing mechanism each time the tool body rotates about the pipe. Also, instead of a cutter roll, a cutter knife can be used.

It is accordingly an object of the present invention to provide a new and improved cutting tool which is self-clamping to a tube or pipe and operable to sever a pipe or tube with use of only limited angular motion of the tool arm.

It is a further object of the present invention to provide a new and improved cutting tool which is automatically driven about the axis of a pipe for severing the pipe.

It is an additional object of the present invention to provide a new and improved cutting tool in which the cutter tool is automatically advanced driving the cutting operation.

DESCRIPTION OF THE DRAWINGS

The details of the invention may best be understood in reference to the drawings in which:

FIG. 1 illustrates a side view of a pipe cutter and details of the roller cutting mounting;

FIG. 2 is an end view taken along line 2—2 of FIG. 1;

FIG. 10 is a side view of another embodiment in which the cutter tool is automatically advanced;

FIG. 11 is a view taken along line 10—10 of FIG. 10; and

FIG. 12 is a view of another cutter embodiment.

DESCRIPTION OF THE INVENTION

Figure 3:
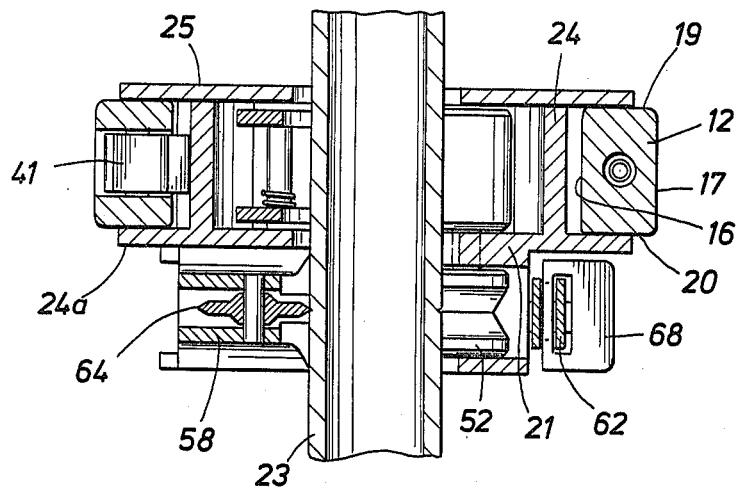
FIG. 3 is a view in cross-section taken along line 3—3 of FIG. 1.

Referring now to FIG. 1, the tool 10 of the present invention includes an elongated torque or tool arm 11 connected to a C-shaped tool housing 12. The opening 13 between the ends 14 and 15 of the housing 12 is sized to admit entry of a pipe 23 to be cut. The housing 12 has an inner and outer cylindrically formed walls 16 and 17 which are cylindrically shaped about a central tool axis 29. As shown in FIGS. 2 and 3, the side walls 19, 20 of the tool housing 12 are parallel.

Rotatively disposed within the tool housing 12 is a tool body 21. The tool body 21 has a C-shaped roller housing portion 24 (see FIG. 4) rotatively received within the inner cylindrical wall 16 of the tool body 21. To one side of the housing portion 24 is a C-shaped flange 24a which slidably engages one of the side walls 20 of the tool housing 12. A C-shaped flat plate member 25 attaches to the other side wall of the housing portion 21 and slidably engages the other side wall 19 of the tool housing 12. The housing portion 21 has a hollow interior 26 which contains a set of three clamping rolls. Two of the clamping rolls 27, 28 are rotatively mounted to one side of the central axis 29 of the pipe and the central tool axis 29. The axes of the rolls 27, 28 are fixed parallel to the tool axis 29. On an opposing side of the tool axis 29 is an arm 30 (see FIG. 4) pivotally mounted on a pin 22 and spring biased to urge the free end of the arm 30 toward the tool axis 29. On the free end of the arm 30 is a clamping roll 31 which is adapted to engage the outer surface of a pipe. The rolls 27, 28 and 31 provide a three point clamping contract with the pipe. The spring biased roller arm 30 permits the roll 31 to move toward and away from the tool axis 29. The arrangement of the spring arm roll 31 and the upper roll 27 is such that the spacing between the rollers is less than the outer diameter of the pipe 23 so that when the pipe engages the rollers 27 and 28, the upper rolls 31 and 27 contact the pipe at an included angle of less than 180 degrees. This arrangement permits the tool to be self-supporting or self-clamping on a pipe independent of any other contact. In other words, the spring pressure applied to the roll 31 is adequate to support the weight of the entire tool. Hence, when the rolls 27, 28 and 31 engage the pipe, the tool will not fall off the pipe.

At three circumferential locations on the housing 12 are ratchet recesses 40 which extend between the inner and outer walls 16, 17. Each recess 40 contains a ratchet mechanism which respectively has a ratchet pawl 41 (See FIG. 4) which is pivotally mounted in a recess 40. The body of the pawl 41 is engaged by a spring biased pin member 42 which normally holds the pawl 41 in a position where its free end extends inwardly of the housing 12 and past the confines of the inner wall 16. The outer cylindrical surface of the tool body 21 has regularly spaced recesses 43 which complementarily register with the free end of a pawl 41.

Figure 4:
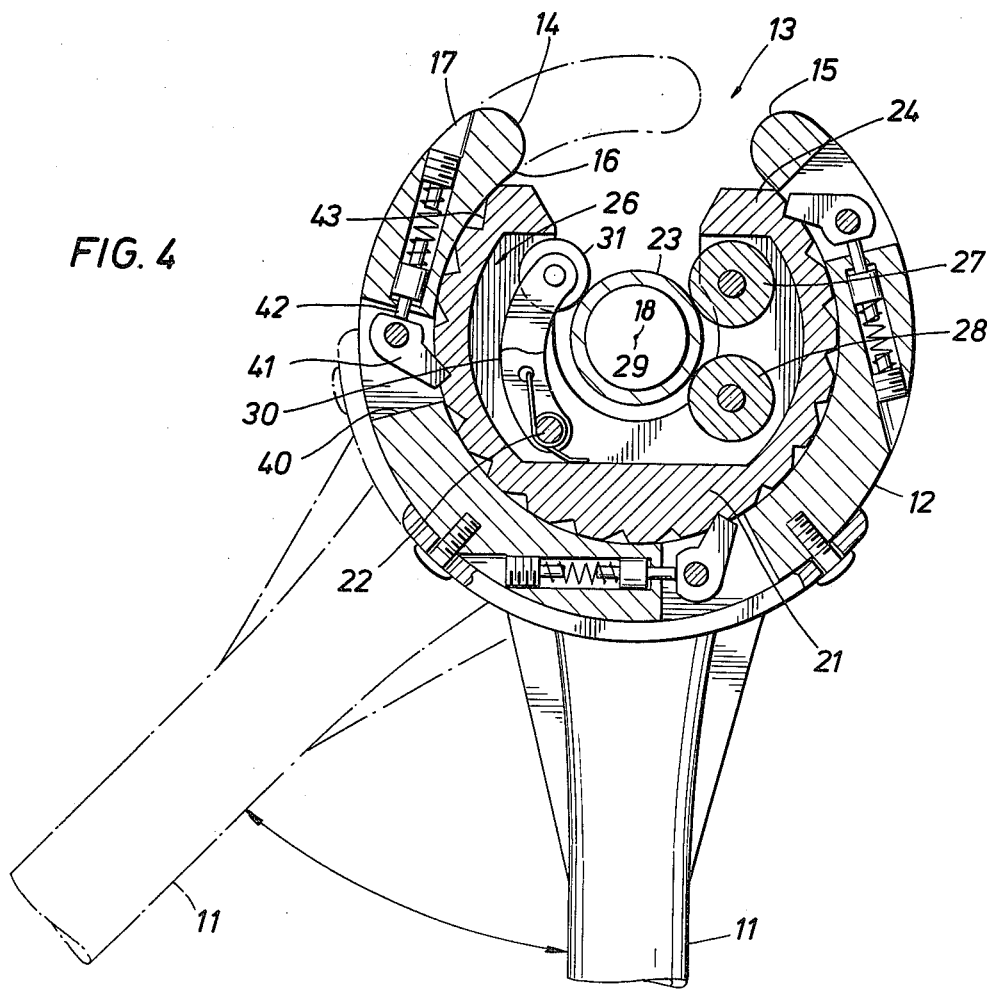
FIG. 4 is a view in cross-section taken along line 4—4 of FIG. 2.
Figure 5:
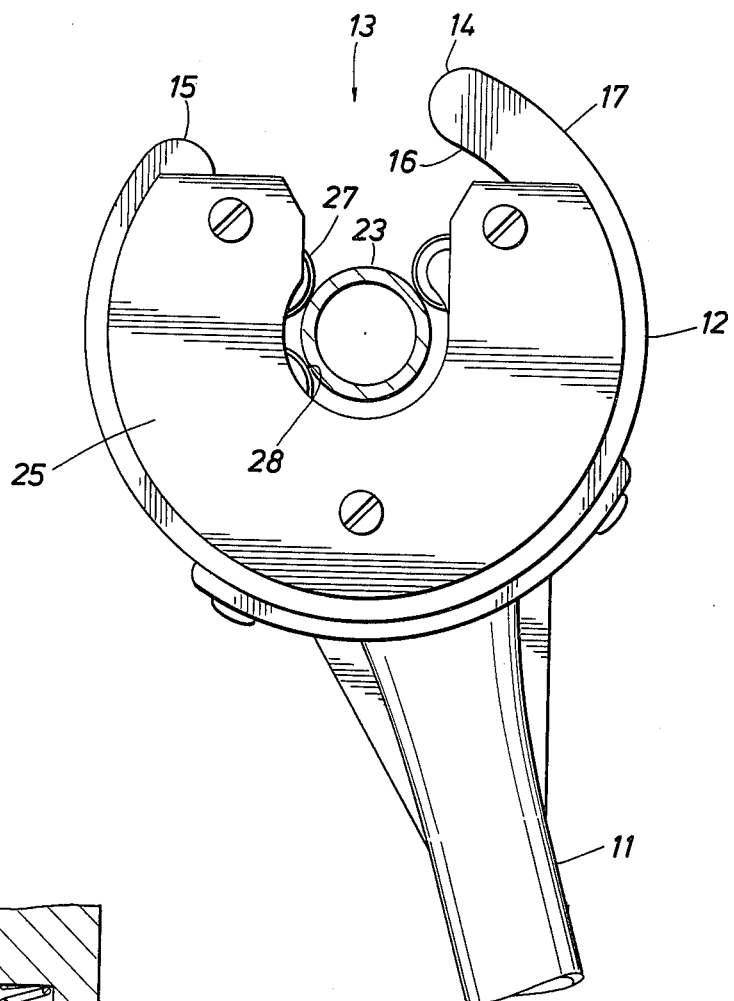
FIG. 5 is a side view taken along line 5—5 of FIG. 2.

As can be appreciated from FIG. 4, if the tool housing 12 is rotated in a clockwise direction, the pawls 41 are pivoted outwardly against the pressure of the spring biased pin 42 thereby permitting the tool housing to be rotated relative to the tool body 21. If the tool housing 12 is rotated in a counterclockwise direction, the pawls 41 engage surfaces on the recess 43 so that the tool housing 12 and tool body 21 are rotated together about the tool axis 29.

The circumferential position of the pawls 41 relative to the C-shaped outer portion of the tool body 21 is such that one of the pawls 41 always engages a recess in the tool body 21. When the pipe access openings of the tool body 21 and tool housing 12 are aligned, the tool can receive a pipe 23.

The housing portion 24 has a side extension 50 (See FIGS. 1 and 2) in which a pair of back-up rolls 51 and 52 are rotatively mounted to one side of the central axis 29 and are located in a vertical housing section 53. The back-up rolls each have V-shaped annual grooves 54.

The vertical housing section 53 has a horizontal housing section 55 which has inner and outer side bar members 56 and 57 defining a horizontal recess. Slidably mounted between the side bar members 56 and 57 is a slide housing 58 which has upper and lower flanges 59, 60 to retain the position of the slide housing 58 members 56, 57. On the slide housing 58 is a cutting roll 64 which has a V-shaped cutting edge and is generally arranged to cut in the vertical plane extending through the V-grooves of the backup rolls 51 and 52. The axis of the cutting roll 64 is arranged on a horizontal plane which is located intermediate of the vertical distance between the axes of the backup rollers 51 and 52.

The slide housing 58 has a threaded opening 63 which receives a threaded member 65. The threaded member 65 is rotatively mounted in the housing section 53 and a spring 66a is disposed between the slide housing 58 and the vertical housing 53. Rotation of the threaded member 65 can either advance or retract the slide housing 58 relative to the vertical housing 53. Advancement or retraction of the slide housing 58 moves or retracts the cutter roll 64 toward or away from the central axis 29 of a pipe.

Rotation of the threaded member 65 is controlled by an advancing mechanism which includes a ratchet gear 62 attached to the threaded member 65. A bifurcated handle 67 is rotatively attached to the threaded member 65. Between the bifurcated sides of the handle 67 is a latch 68 (see Figs. 6 and 7) which is pivotally mounted between the sides of the handle. The latch 68 is operated by a thumb handle and pivots between a position where a forward latch member 69 engages the gear 66 and a position where a rearward latch member 70 engages the gear 66. A spring biased pin 71 is provided in the handle 67 to releasably retain the latch 68 in a given position of engagement. In one position of the latch 68, rotation of the arm 67 in one direction rotates the threaded member 65 in one rotative direction. In the opposite position of the latch 68, rotation of the handle 67 in an opposite direction rotates the threaded member 65 in an opposite rotational direction. By positioning of the latch 68, the cutter roll 64 is advanced or retracted by operation of the latch arm 67.

Figure 6:
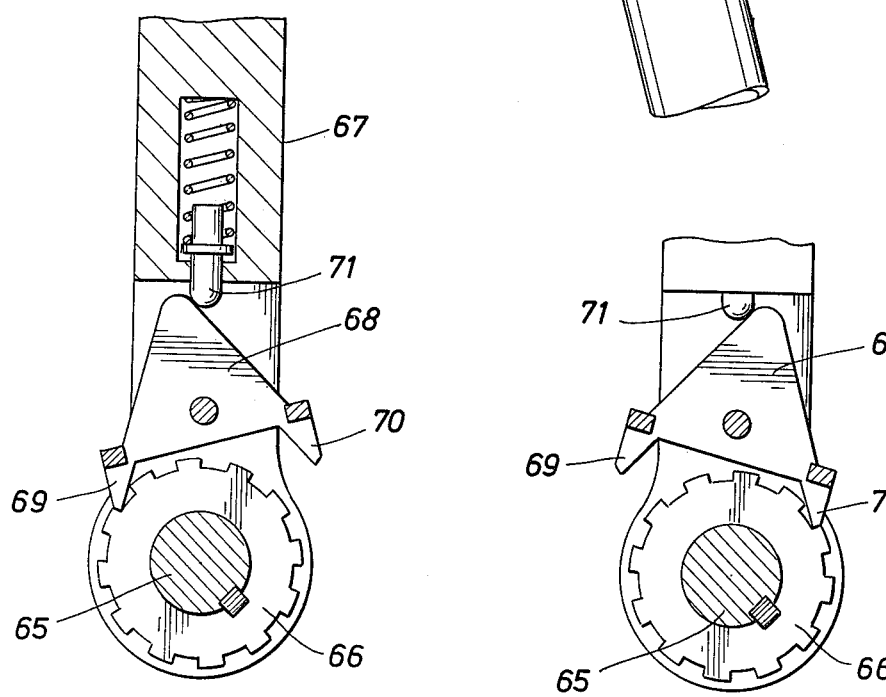
FIG. 6 is a view in cross-section through a ratchet control for the roller cutter.
Figure 7:
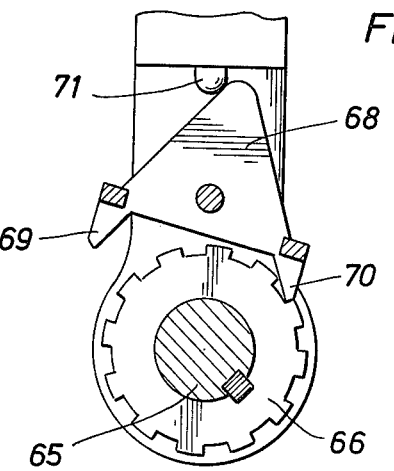
FIG. 7 is a view similar to FIG. 6 but illustrating the ratchet in another position.

The latch member 69 or 70 on the latch 68 is spring biased into position. Thus, as shown in FIG. 6, counterclockwise rotation of the handle 67 will rotate the threaded member 65 while rotation in a clockwise direction will ratchet the member 69 over the ratchet teeth on the ratchet gear to a new position.

In operation, the latch 68 is properly positioned and the handle 67 is operated back and forth to move the cutter roll 64 to an "open" position where a pipe can be received between the cutter roll 64 and support rolls 51 and 52. The tool body 21 and tool housing 12 are rotated relative to one another to place the openings of the body and housing into alignment to receive a pipe.

The tool opening is passed over a pipe with the spring biased roll 31 first moving out of the way of the pipe and then serving to enclose the pipe within the set of rolls 27, 28 and 31. The tool is then self-clamped on the pipe.

The latch 68 is reversed and the handle 67 operated to bring the cutting roll 64 and rolls 51 and 52 into engagement with the pipe. Back and forth rotative motion of the arm 11 will operate the ratchet mechanism between the tool body and tool housing and rotate the tool body about the axis of the pipe. As necessary, the handle 67 is operated to advance the cutting roll 64 until the pipe is served.

Figure 8:
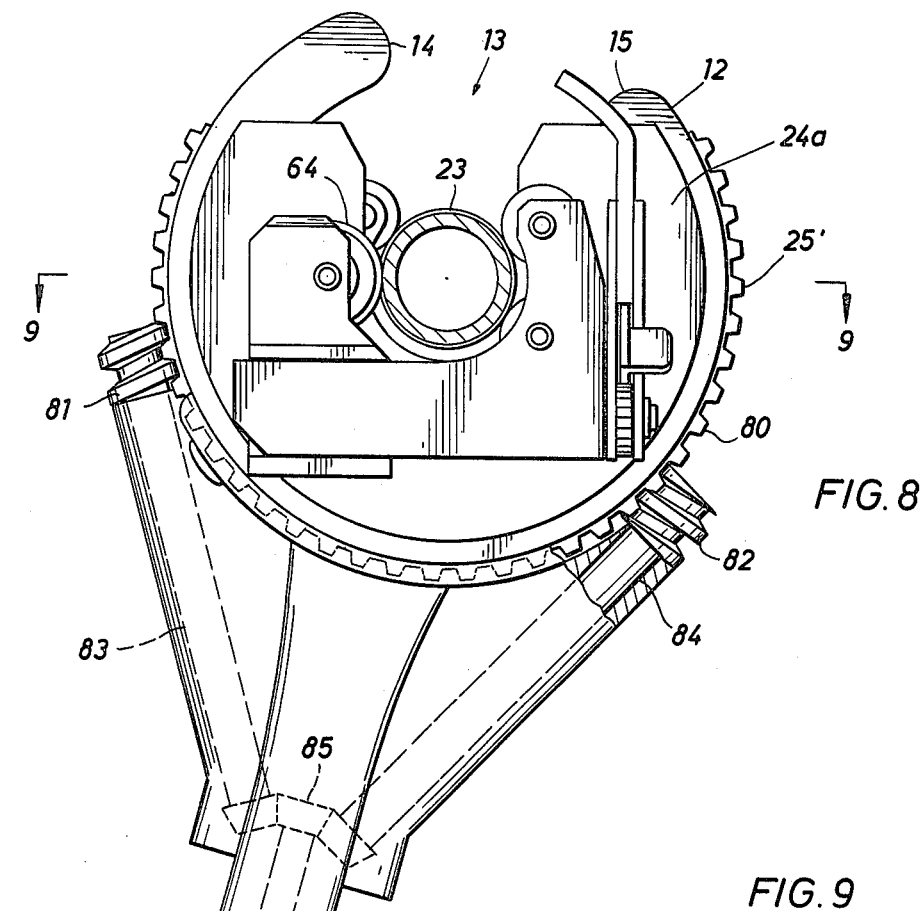
FIG. 8 is a side view of another embodiment in which the tool body is automatically driven.
Figure 9:
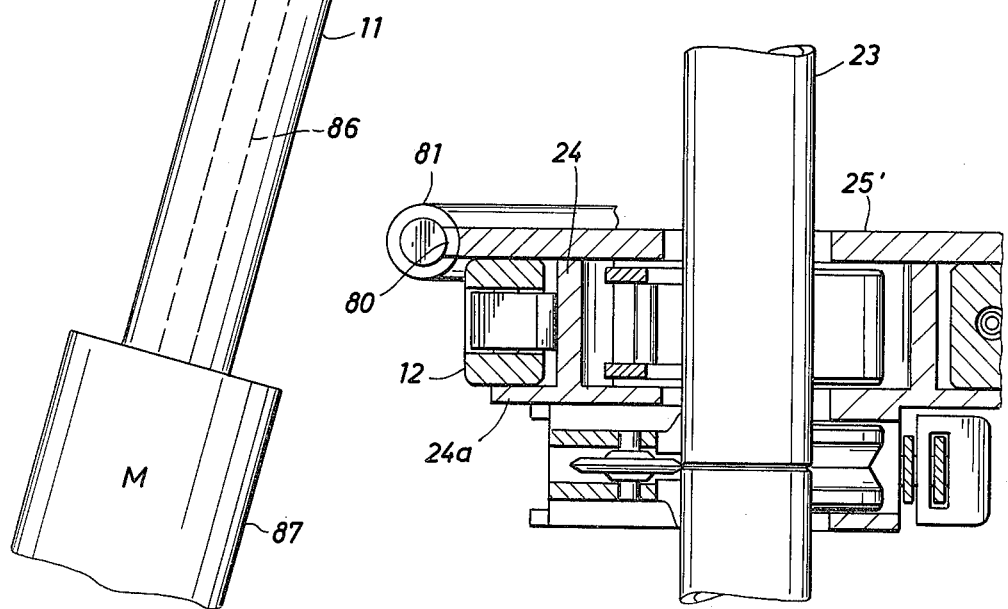
FIG. 9 is a view in cross-section taken along line 9—9 of FIG. 8.

Referring now to FIGS. 8 and 9, another embodiment of the present invention is illustrated wherein similar numerals to the numbers used before designate generally similar parts. In this embodiment, the tool body is rotated about the tube by a motor. In FIGS. 8 and 9, the roller housing portion 24 has a C-shaped plate member 25' attached to one side. The plate member 25' has worm gear teeth 80 disposed on its outer surface. The teeth 80 mesh with worm threads 81 and 82 disposed on ends of rotatably supported shafts 83 and 84. The other ends of shafts 83 and 84 have gears which engage a driving gear 85. The driving gear 85 is on a shaft 86 which is driven by a motor 87.

As illustrated, the worm gear teeth 80 extend for an arc of approximately 270 degrees except for the open space between the ends of the gear teeth 80. The angle of the arc between the position of the threads 81 and 82 is greater than the angle between the ends of the gear teeth 80 so that at least one thread 81 or 82 is in driving engagement with the teeth 80 throughout a 360 degree rotation of the housing portion 24.

Referring now to FIGS. 10 and 11, an automatic feed for the cutter element is illustrated. In this embodiment, the threaded member 65 is provided with a spur gear 75 at its outer end. The spur gear is sized so that the teeth 76 can project into the plane defined by the outer surface of the plate member 24a.

The shaft 65 is rotated with the tool body about the axis of a tube and the spur gear 75 is rotated therewith. On the handle 11 is a cam pin 78 which is slidably mounted in a pin housing 79 for movement between two locked positions. The housing 79 is slightly canted with respect to the handle 11 and the pin 78 is illustrated in an actuation position.

In the actuation position of the pin 78, each time the gear 75 is rotated about a tube, one of the teeth of the gear 75 will engage the pin 78 and the gear 75 be rotated an incremental distance about its rotational axis. Rotation of the gear 75 rotates the threaded member 65 and advances or retracts the cutting member depending upon the setting of the tool. Pin 78 can be retracted to disengage the advancing mechanism from operation.

As shown in FIGS. 10 and 12, the cutting member can be a cutter blade 80 which is mounted in a conventional holder. Blade 80 can be substituted for a cutter roller.

While only selected embodiments of the present invention are illustrated and described herein, other embodiments of the invention are contemplated and many changes and modifications of the inventions may be made within the scope of the appended claims without departing from the spirit of the invention.

I claim:

1. In a device for use in severing a tubular member the apparatus comprising:
    a C-shaped housing member attached to an elongated torque arm member;
    a C-shaped tool body member rotatively supported within said C-shaped housing member for rotation about a central axis, said body member carrying two independent sets of rolls, one of said sets comprising a plurality of clamping rolls disposed about said central axis for self-supporting said device on a tubular member, the other of said sets comprising cutter means disposed to one side of said central axis and support roll means disposed at an opposite side of said central axis for respectively cutting and supporting a tubular member;
    means mounting one of said clamping rolls for permitting movement of said one clamping roll toward and away from said central axis so that a tubular member can be received within the confines of a cylindrical plane defined by said clamping rolls so as to hold said device in place; and
    means on said housing member and said body member for rotating said body member about said central axis.

2. The device as set forth in claim 1 wherein said rotating means is responsive to movement of said arm member in one rotational direction for rotating said body member about said cental axis, and responsive to movement of said arm member in an opposite rotational direction for disconnecting said housing member relative to said body member, whereby said tool body member may be rotated about central axis in response to limited angular motion of said arm member.

3. The device as set forth in claim 1 wherein said rotating means includes motor means.

4. The device as set forth in claim 1 including means for selectively moving said cutter means relative to said support roll means for advancing or retracting said cutter means relative to said central axis independent of the respective position of said body member to said housing member.

5. The device as set forth in claim 4 wherein said clamping rolls include
    means mounting one of said clamping rolls for permitting movement of said one clamping roll toward and away from said central axis; and
    resilient means connected to said mounting means for providing a resilient clamping force for said one clamping roll.

6. The device as set forth in claim 4 wherein said selectively moving means includes a slide housing supporting said cutter means and a housing on said tool body member supporting said support roll means,
    said cutter means and support roll means having axes disposed parallel to said central axis.

7. The device as set forth in claim 6 wherein said selectively moving means includes screw-operated slide means and ratchet operated handle means for operating said screw-operated slide means.

8. The device as set forth in claim 6 wherein said selective moving means includes screw-operated slide means for operating said slide means on each evolution of said slide housing about said central axis.

9. The device as set forth in claim 5 wherein each of said clamping rolls has an axis disposed parallel to said central axis for said tool body member in a housing portion of the tool body member adjacent to said cutter means; and further including interconnecting means provided with a ratchet mechanism disposed between said housing member and said tool body member which includes spring biased pawl means in said housing for engaging recesses in the outer surface of said tool body member.

* * * * *